(12) United States Patent
An et al.

(10) Patent No.: US 11,168,003 B2
(45) Date of Patent: Nov. 9, 2021

(54) METHOD FOR INHIBITING EXTRACTANT DEGRADATION BY DILUENT AND EXTRACTANT INPUT METHOD

(71) Applicant: KOREA RESOURCES CORPORATION, Wonju-si (KR)

(72) Inventors: Jeon Woong An, Wonju-si (KR); Youn Kyu Yi, Wonju-si (KR); Sang Seo Lee, Seongnam-si (KR); Seung Ho Lee, Ansan-si (KR)

(73) Assignee: KOREA RESOURCES CORPORATION, Wonju-si (KR)

( * ) Notice: Subject to any disclaimer, the term of this patent is extended or adjusted under 35 U.S.C. 154(b) by 215 days.

(21) Appl. No.: 16/523,349

(22) Filed: Jul. 26, 2019

(65) Prior Publication Data

US 2021/0024368 A1    Jan. 28, 2021

(51) Int. Cl.
| | | |
|---|---|---|
| C01G 9/00 | (2006.01) | |
| C22B 3/16 | (2006.01) | |
| C01G 51/00 | (2006.01) | |
| G01N 30/86 | (2006.01) | |
| C22B 3/00 | (2006.01) | |
| C22B 3/06 | (2006.01) | |
| G01N 30/02 | (2006.01) | |

(52) U.S. Cl.
CPC ........... *C01G 51/003* (2013.01); *C01G 9/003* (2013.01); *C22B 3/06* (2013.01); *C22B 19/22* (2013.01); *C22B 23/0415* (2013.01); *G01N 30/8679* (2013.01); *G01N 2030/025* (2013.01)

(58) Field of Classification Search
CPC ....... G01N 2030/009; G01N 2030/025; G01N 2030/027; C22B 23/04; C01G 9/003
See application file for complete search history.

(56) References Cited

PUBLICATIONS

Degradation of Diluents used with TBP in solvent extraction, Field et al., 1960, Chemistry Division, Atomic Energy Researcli Establishment, Harwell, Berkshire.*
Reagent degradation in the Synergistic solvent extraction system LIX 63/Versatic 10/Nonyl-4PC, Hutton-Ashkenny et al., 2016, Solvent extraction and Ion exchange.*
Synergistic Solvent Extraction of Nickel and Cobalt: A Review of Recent Developments, Cheng et al., 2011, Solvent extraction and Ion exchange.*

* cited by examiner

*Primary Examiner* — Haidung D Nguyen
(74) *Attorney, Agent, or Firm* — Cantor Colburn LLP

(57) ABSTRACT

Provided is a method for inhibiting extractant degradation by a diluent and an extractant input manner, the method including steps of: (a) determining and analyzing the total volume of the DSX solvent when the diluent and the extractant, which are the DSX solvents, are added in the DSX process and identifying the concentration of the extractant; (b) calculating an extractant concentration according to an amount of the diluent to be added based on the analysis value of step (a), and then adding the extractant; (c) determining the ratio between the extractants through analysis after adding the extractants; (d) adding the extractant to be needed when the ratio between extractants is out of the range; and (e) adding the diluent and analyzing the ratio between the extractants.

5 Claims, 3 Drawing Sheets

FIG. 1

(a) Determining and analyzing the total volume of the DSX solvent when the diluent and the extractant, which are the DSX solvents, are added in the DSX process and identifying the concentration of the extractant

↓

(b) Calculating an extractant concentration according to an amount of the diluent to be added based on the analysis value of step (a), and then adding the extractant

↓

(c) Determining the ratio between the extractants through analysis after adding the extractants

↓

(d) Adding the extractant to be needed when the ratio between extractants is out of the range

↓

(e) Adding the diluent and analyzing the ratio between the extractants

METHOD FOR INHIBITING EXTRACTANT DEGRADATION BY DILUENT AND EXTRACTANT INPUT METHOD

BACKGROUND OF THE INVENTION

1. Field of the Invention

The present invention relates to a method for inhibiting the extractant degradation, and more particularly, to a method for effectively inhibiting the extractant degradation by adjusting a ratio of mol total metal/mol oxime according to a diluent and extractant input method in Boleo cobalt/zinc solvent extraction (synergistic solvent extraction, hereinafter referred to as "DSX").

2. Description of the Related Art

The cobalt/zinc solvent extraction process (DSX process) is a process for simultaneously extracting cobalt (Co) and zinc (Zn) using two solvents. In order to increase the extraction rate, soda ash ($Na_2CO_3$) is added to adjust the optimum pH.

The soda ash added by the above-mentioned method increases the extraction rate by adjusting the pH, but it reacts with cobalt or manganese so that cobalt carbonate ($CoCO_3$) or manganese carbonate ($MnCO_3$) are precipitated to lower the extraction rate and to cause degradation of the extractant, resulting in difficulty to recover cobalt and zinc.

The higher the pH adjusted by the above-mentioned method, the higher the extraction rate of cobalt (Co) and zinc (Zn) to be recovered. However, the extraction rate of manganese, cadmium and copper ions acting as impurities becomes higher as well.

The manganese extracted by the above-mentioned method is the leading cause of the oxime degradation, which is an extractant, and the high manganese extraction causes the degradation of the extractant in the DSX process.

When the extractant is decomposed by the above-mentioned method, the extracted impurities (cobalt, zinc, manganese, cadmium, copper ions, etc.) overload the extraction capacity of the oxime in extractants, which increases the mol total metal/mol oxime to accelerate the degradation of extractants.

When the degradation of the extractant is accelerated by the above-mentioned method, the extraction capacity of the oxime in the process is decreased, thereby reducing the extraction rate of cobalt and zinc to be recovered.

If the extraction rate is lowered by the above-mentioned method when operating the process, it tends to increase the extraction rate by operating with a pH higher than the optimum pH. However, this accelerates the degradation of the extractant and causes a vicious cycle of the process.

When a vicious cycle is progressed by the above-mentioned method, the extraction rate is lowered. Thus, the extractant needs to be continuously fed in an amount equal to or greater than the decomposed amount. When the vicious circle is continuously maintained, the degradation of the extractant is accelerated, thereby requiring an additional feed of an enormous amount of extractant. If this deteriorates further, the degradation of the extractant cannot be reversed, and the DSX process must be stopped. If the DSX process is re-operated, it will incur enormous economic losses because all the solvents (all the decomposed extractants) are removed and re-input into the DSX process.

In general solvent extraction, the diluent is added to control the entrainment caused in the process or control the phase separation time by increasing the volume of the solvent layer.

For example, in the copper solvent extraction, the volume of solvent needed to control entrainment is calculated to add the diluent. During the addition of diluent, the process is operated to control the total volume without additional analysis.

Further, since the synergistic effect is not expected according to the ratio of the extractant when the extractant is added, the extractant is added according to the target metal amount and the pH change of the pregnant leach solution.

For example, when the copper concentration of the pregnant leach solution is higher than the extractant limit, the extractant is added to increase the extractant limit. When the copper concentration of the pregnant leach solution is low to extract impurities, the diluent is added to control the impurities and to be diluted, thereby reducing the extractant limit.

Also, for example, when copper extraction efficiency is lowered according to the pH change of the pregnant leach solution, the diluent may be added to control the impurities and to be diluted, thereby reducing the extractant concentration.

However, the general solvent extraction is not accompanied by an analysis to control the concentration of the extractant when a diluent is added. In the DSX process, the diluent and the extractant cannot be added in the same manner as the general solvent extraction. The addition of the diluent and the extractant may result in the change in the amount of the unit metal that can be acceptable to the extractant to cause severe degradation of the extractant.

In the DSX process, the addition of diluent and extractant should be performed in such a way as to calculate the change in mol total metal/mol oxime by the analysis and to prevent oxime overload. The ratio of the extractants should also be significantly adjusted for the synergistic effect of the two extractants.

In the above-mentioned DSX process, when the extractant and the diluent are fed in the same manner as the general solvent extraction, it accelerates the degradation of extractants. Thus, the DSX process has the feature that the extractant and the diluent cannot be added as in the conventional solvent extraction.

SUMMARY OF THE INVENTION

Accordingly, an object of the present invention is to provide a novel method for effectively inhibiting the extractant degradation by adjusting a ratio of mol total metal/mol oxime according to a diluent and extractant input method in Boleo cobalt/zinc solvent extraction (DSX).

In order to solve the above-mentioned problems, the present invention provides a method for inhibiting extractant degradation by a diluent and an extractant input manner, the method including steps of: (a) determining and analyzing the total volume of the DSX solvent when the diluent and the extractant, which are the DSX solvents, are added in the DSX process and identifying the concentration of the extractant; (b) calculating an extractant concentration according to an amount of the diluent to be added based on the analysis value of step (a), and then adding the extractant; (c) determining the ratio between the extractants through analysis after adding the extractants; (d) adding the extractant to be needed when the ratio between extractants is out of the range; and (e) adding the diluent and analyzing the ratio between the extractants.

Further, the present invention provides the method for inhibiting extractant degradation by a diluent and an extractant input manner in which the DSX solvent includes an oxime-based extractant and a neodecanoic acid-based extractant in addition to kerosene, a diluent.

Further, the present invention provides the method for inhibiting extractant degradation by a diluent and an extractant input manner in which the extractant concentration is measured using a gas chromatography, the oxime-based extractant concentration is measured by a method of measuring anti-oxime, and the neodecanoic acid-based extractant concentration is measured by a method of removing the diluent contained in the solvent to measure the neodecanoic acid-based extractant.

Further, the present invention provides the method for inhibiting extractant degradation by a diluent and an extractant input manner in which a volume ratio of the oxime-based extractant and the neodecanoic acid-based extractant is 1:0.5 to 4.

Further, the present invention provides the method for inhibiting extractant degradation by a diluent and an extractant input manner in which a volume ratio of the neodecanoic acid-based extractant and the diluent is 1:0.5 to 3.0 when the neodecanoic acid-based extractant is added, and before adding, the neodecanoic acid-based extractant and the diluent are stirred for 10 minutes to 60 minutes.

Further, the present invention provides the method for inhibiting extractant degradation in which step (e), the diluent is calculated and added such that the value of molar total metal/molar oxime is not increased by adding the diluent.

The present invention has effects of inhibiting the extractant degradation by adjusting a ratio of mol total metal/mol oxime according to a diluent and extractant input manner in Boleo cobalt/zinc solvent extraction process.

BRIEF DESCRIPTION OF THE DRAWINGS

FIG. 1 is a flowchart of a method for inhibiting the extractant degradation according to a diluent and extractant input manner of the present invention.

DETAILED DESCRIPTION OF THE PREFERRED EMBODIMENT

Hereinafter, embodiments of the present invention are described in detail with reference to the accompanying drawings, which will be readily apparent to those skilled in the art to which the present invention pertains. The present invention may be embodied in many different forms and is not limited to the embodiments described herein.

FIG. 1 is a flowchart of a method for inhibiting the extractant degradation according to a diluent and extractant input manner of the present invention.

The present invention relates to a method for inhibiting extractant degradation by a diluent and an extractant input manner, and the method includes steps of (a) determining and analyzing the total volume of the DSX solvent when the diluent and the extractant, which are the DSX solvents, are added in the DSX process and identifying the concentration of the extractant; (b) calculating an extractant concentration according to an amount of the diluent to be added based on the analysis value of step (a), and then adding the extractant; (c) determining the ratio between the extractants through analysis after adding the extractants; (d) adding the extractant to be needed when the ratio between extractants is out of the range; and (e) adding the diluent and analyzing the ratio between the extractants.

In step (a), for example, the diluent to be added includes a kerosene-based diluent, and the extractant includes an oxime-based extractant and a neodecanoic acid-based extractant.

In step (a), in order to measure an oxime-based extractant concentration, anti-oxime can be measured using a gas chromatograph. Further, in order to measure a neodecanoic acid-based extractant concentration, the diluent contained in the solvent may be removed using a gas chromatograph.

Figure 2:
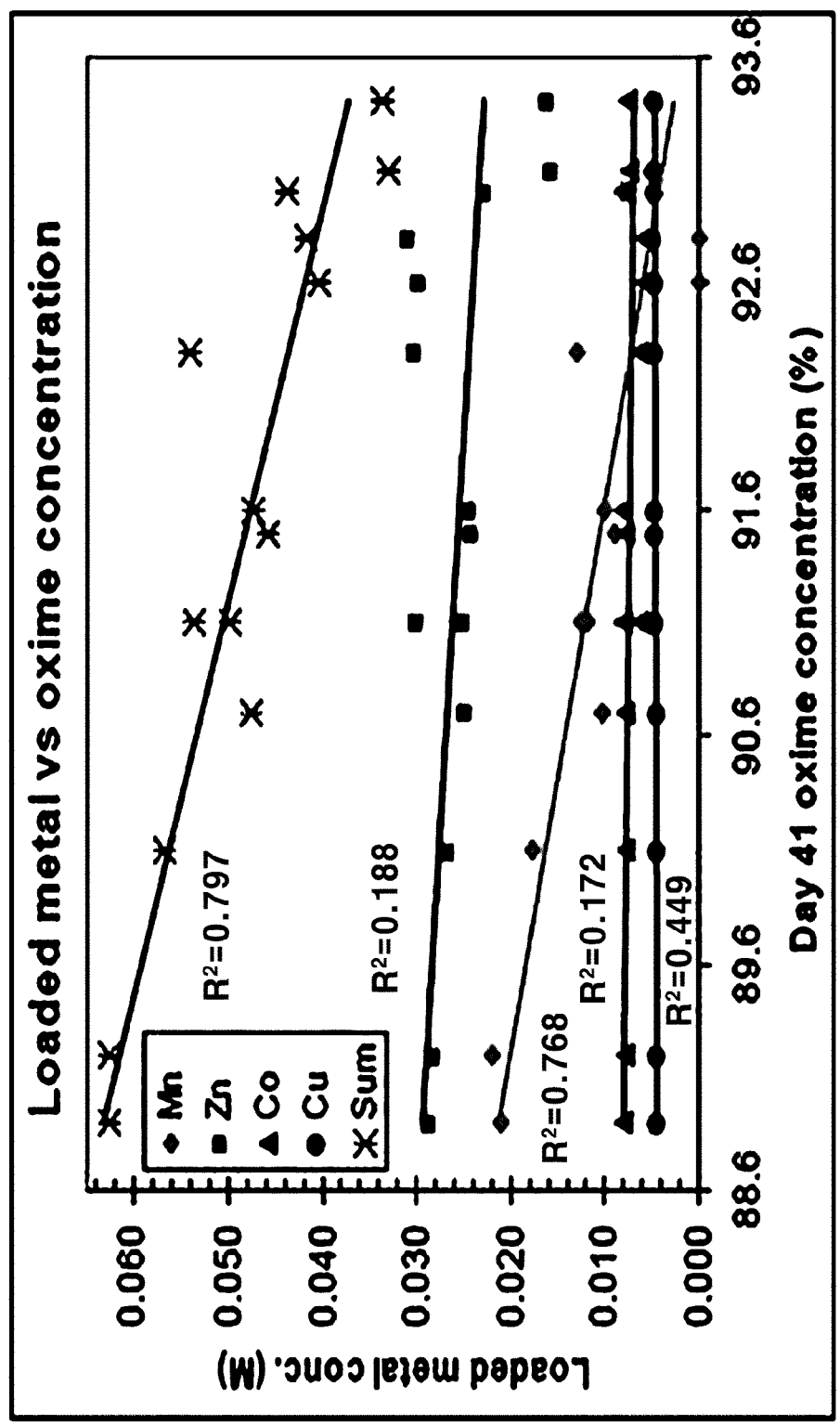
FIG. 2 shows the correlation between the metal concentration and the oxime concentration contained in the solvent according to an embodiment of the present invention.

FIG. 2 shows the correlation between the metal concentration and the oxime concentration contained in the solvent according to an embodiment of the present invention.

In FIG. 2, each point shows the individual experimental result (each metal according to color) based on 41 days of a unit experimental day. FIG. 2 is a graph showing the concentration of oxime after 41 days according to the concentration of each metal.

The higher the amount of metal loading in the solvent, the lower the concentration of oxime, indicating that the more the metal is extracted (loaded), the faster the degradation of the solvent. Therefore, it is necessary to lower the total metal amount in the DSX process in order to prevent oxime overload.

Referring to FIG. 2, In step (b), the extractant may be added in consideration of the concentration of the extractant measured in step (a) and the amount of the diluent to be added. When adding the diluent, the mol oxime value is decreased by the diluent addition. Thus, the value of the mol total metal/mol oxime is increased. Therefore, the amount of oxime-based extractant is calculated and added according to the amount of diluent added.

Further, the oxime-based extractant can be added according to an increase in the target metal amount of the DSX feed solution.

The DSX feed solution refers to a solution of including cobalt (Co) and zinc (Zn), further including aluminum (Al) and manganese (Mn), and further including at least one of cadmium (Cd), copper (Cu), potassium (K), calcium (Ca), sodium (Na), and nickel (Ni).

The increase of the metal amount of the DSX feed solution increases the mol total metal by extraction, causing the high value of the mol total metal/mol oxime. Thus, the oxime-based extractant is added according to the change of the metal amount.

The neodecanoic acid-based extractant can be added to prevent the change of the ratio of extractants due to the addition of the diluent and the oxime-based extractant. The neodecanoic acid-based extractant is mixed with the oxime-based extractant so as to show a synergistic effect for the selective metal extraction. However, the ratio between the extractants must be maintained.

In order to maintain the ratio between the extractants, the ratio of the oxime-based extractant to the neodecanoic acid-based extractant is adjusted in a range from 0.5 to 4, preferably from 1 to 3, and more preferably from 1 to 2.

When the neodecanoic acid-based extractant is added while directly contacting to the solvent, it may cause the degradation of the solvent and the local destruction of the ratio between extractants. Thus, the neodecanoic acid-based extractant is added with the diluent such that the ratio of the diluent to the neodecanoic acid-based extractant is adjusted to be 0.5 to 3, preferably 0.5 to 2.

Further, when the neodecanoic acid-based extractant is added, the neodecanoic acid-based extractant is mixed with the diluent, and the mixture is stirred for 10 minutes to 60 minutes and preferably 10 minutes to 30 minutes and then added.

In step (c), after the extractant addition, the concentration of the extractant may be measured through the analysis as in step (a) to confirm whether the ratio of the oxime-based extractant to the neodecanoic acid-based extractant is adjusted to be 0.5 to 4.

In step (d), when the ratio between extractions is not adjusted to 0.5 to 4, the required extractant may be added as in step (b).

In addition, when the neodecanoic acid-based extractant among extractants is added in step (b) and (d), it is mixed with the diluent and then the mixture is added in order to maintain the synergistic effect of the extractants according to the ratio between extractants and to prevent the local destruction of the ratio between the extractants. This is the reason that the extractant to be added is mixed with a diluent in order to prevent the degradation of the solvent by direct contact with the DSX solvent.

Figure 3:
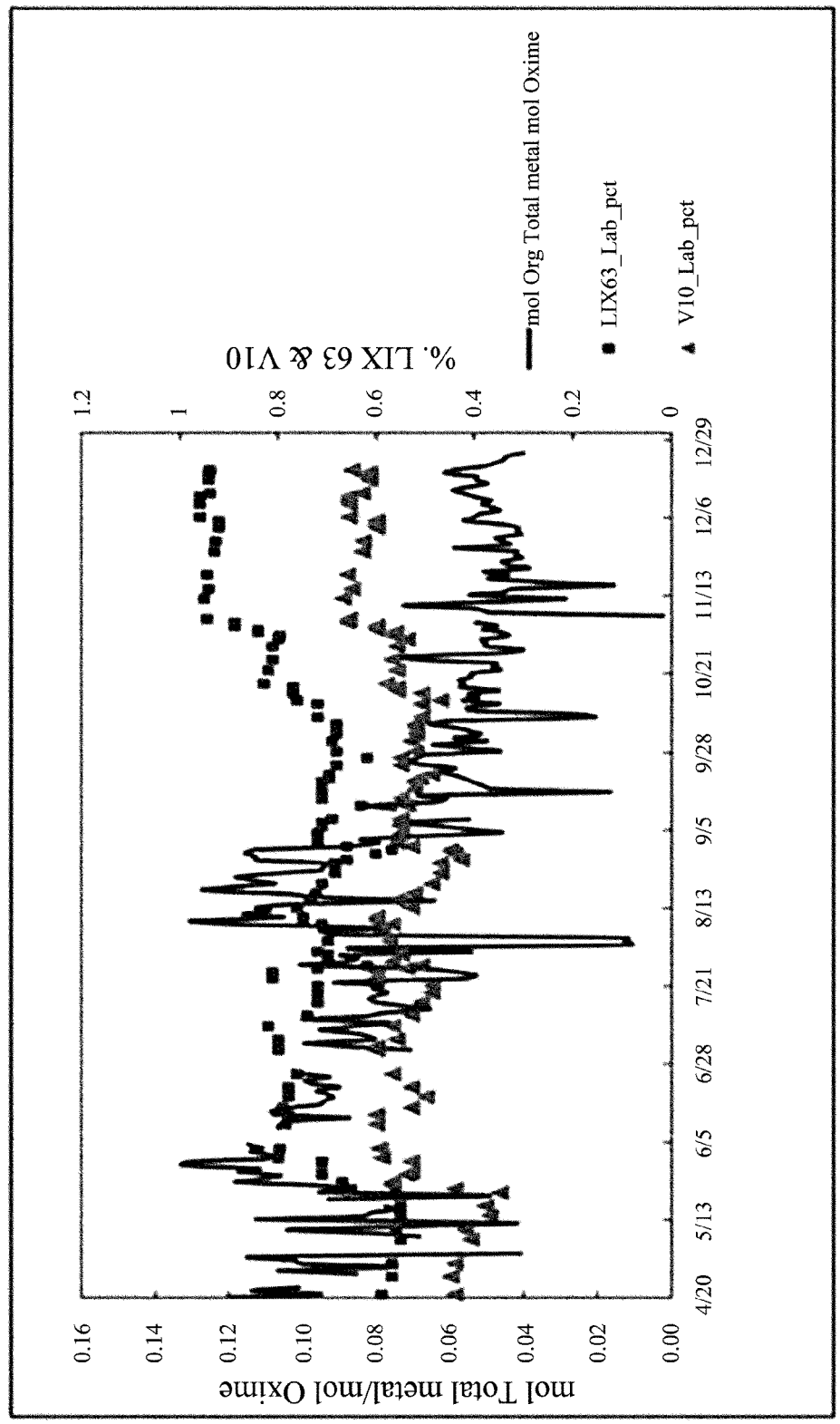
FIG. 3 shows an aspect of the extractant concentration and mol total metal/mol oxime caused by the operation results for preventing the solvent degradation according to one embodiment of the present invention.

FIG. 3 shows an aspect of the extractant concentration and mol total metal/mol oxime caused by the operation results for preventing the solvent degradation according to one embodiment of the present invention.

FIG. 3 illustrates the results of measuring the concentration of oxime (LIX 63) and neodecanoic acid (V10) which are extractants in the DSX process and the analysis value of mol total metal/mol oxime. Referring to values of manganese metal amount extracted (loaded) per unit oxime by the pH, it can be seen that the pH of the DSX process is maintained in the low range after September 1.

It can be confirmed that the pH control in the lower range reduces the mol total metal, and thus the value of the mol total metal/mol oxime is reduced to minimize the extractant degradation.

Referring to FIG. 3, in step (e), the diluent can be finally added by confirming the ratio between the extractants through step (c) and step (d).

The diluent may be added so as not to increase the value of the mol total metal/mol oxime, the concentration of the extractant may be measured as in step (a), and the ratio between extractants may be confirmed as in step (c). After the diluent is added, the extractant may be analyzed as the above step to confirm the concentration of the extractant and the ratio between the extractants. The steps above may be repeated.

Further, the present invention provides the method of inhibiting the extractant degradation characterized by repeating the above procedures for inhibiting the extractant degradation when adding the dilution and the extractant as required during operation.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description. Therefore, the spirit of the present invention should not be limited to the above-described embodiments, and the following claims as well as all modified equally or equivalently to the claims are intended to fall within the scope and spirit of the invention.

What is claimed is:

1. A method for inhibiting extractant degradation by a diluent and an extractant input manner in a DSX process, the method comprising steps of:
    (a) adding to a first DSX solvent, composed of a first amount of an oxime-based extractant, a first amount of an neodecanoic acid-based extractant, and a first amount of a diluent in the DSX process, a second DSX solvent, composed of a second amount of the oxime-based extractant, a second amount of the neodecanoic acid-based extractant, and a second amount of the diluent, to form a third DSX solvent, and then determining an oxime-based extractant concentration in the third DSX solvent;
    (b) adding a third amount of the oxime-based extractant to the third DSX solvent to form a fourth DSX solvent having a target oxime-based extractant concentration;
    (c) checking a ratio of a total volume of the oxime-based extractant and a total volume of the neodecanoic acid-based extractant in the fourth DSX solvent after step (b);
    (d) mixing a third amount of the neodecanoic acid-based extractant and a third amount of the diluent; and
    (e) adding the third amount of the neodecanoic acid-based extractant and the third amount of the diluent to the fourth DSX solvent to form a fifth DSX solvent having
        a target ratio of a total volume of the oxime-based extractant and a total volume of the neodecanoic acid-based extractant,
        a target ratio a total volume of the neodecanoic acid-based extractant and a total volume of the diluent.

2. The method of claim 1, wherein the first diluent comprises kerosene.

3. The method of claim 2, wherein the oxime-based extractant concentration and a neodecanoic acid-based concentration is measured using a gas chromatograph, and
    wherein the oxime-based extractant concentration is measured by a method of measuring anti-oxime, and the neodecanoic acid-based extractant concentration is measured by a method of removing the diluent contained in the third DSX solvent to measure the neodecanoic acid-based extractant.

4. The method of claim 2, wherein the target ratio of the total volume of the oxime-based extractant and the total volume of the neodecanoic acid-based extractant is 1:0.5 to 4.

5. The method of claim 2, wherein the target ratio of the total volume of the neodecanoic acid-based extractant and the total volume of the diluent is 1:0.5 to 3.0; and
    wherein, before adding, the neodecanoic acid-based extractant and the diluent are stirred for 10 minutes to 60 minutes.

* * * * *